US008851226B2

(12) United States Patent
Culver

(10) Patent No.: US 8,851,226 B2
(45) Date of Patent: Oct. 7, 2014

(54) MECHANICAL BOOLEAN STEERING

(75) Inventor: Dean Culver, Bethel Park, PA (US)

(73) Assignee: Bombardier Transportation GmbH, Berlin (DE)

( * ) Notice: Subject to any disclaimer, the term of this patent is extended or adjusted under 35 U.S.C. 154(b) by 382 days.

(21) Appl. No.: 13/435,019

(22) Filed: Mar. 30, 2012

(65) Prior Publication Data

US 2013/0255531 A1 Oct. 3, 2013

(51) Int. Cl.
*B62D 3/12* (2006.01)
*F16H 19/04* (2006.01)

(52) U.S. Cl.
CPC *B62D 3/12* (2013.01); *B62D 3/126* (2013.01); *F16H 19/04* (2013.01)
USPC ........... 180/400; 180/427; 180/428; 180/444; 74/29

(58) Field of Classification Search
CPC ........... B62D 3/12; B62D 3/126; F16H 19/04
USPC .................................. 180/400, 427, 428, 444
See application file for complete search history.

(56) References Cited

U.S. PATENT DOCUMENTS

| 1,567,172 | A | * | 12/1925 | Powell | 74/29 |
| 2,973,658 | A | * | 3/1961 | Bishop | 91/382 |
| 3,592,075 | A | * | 7/1971 | Clark | 74/498 |
| 4,630,701 | A | * | 12/1986 | Venetjoki | 180/209 |
| 5,307,891 | A | * | 5/1994 | Shaw et al. | 180/400 |
| 6,543,568 | B2 | * | 4/2003 | Cole | 180/428 |
| 8,360,197 | B2 | * | 1/2013 | Escobedo et al. | 180/444 |
| 2009/0032758 | A1 | * | 2/2009 | Stevenson | 251/248 |
| 2010/0106375 | A1 | * | 4/2010 | Ahmed et al. | 701/42 |

FOREIGN PATENT DOCUMENTS

| GB | 1235155 A | * | 6/1971 | ............. F16H 19/04 |
| JP | 57060971 A | * | 4/1982 | |
| JP | 2009208521 A | * | 9/2009 | |

* cited by examiner

*Primary Examiner* — Joseph M Rocca
*Assistant Examiner* — Daniel Yeagley
(74) *Attorney, Agent, or Firm* — The Webb Law Firm

(57) ABSTRACT

A steering system for a vehicle adapted to travel on a track or a guideway includes a drive shaft having a rotational axis and first and second substantially semicircular gear elements provided on the drive shaft and adapted to engage first and second racks, respectively. The first and second substantially semicircular gear elements are offset along the rotational axis of the drive shaft and are located about a common end of the drive shaft. The first substantially semicircular gear element engages the first rack when the drive shaft is rotated in a first direction while the second substantially semicircular gear element engages the second rack when the drive shaft is rotated in a second direction, the second direction being opposite to the first direction. Both first and second substantially semicircular gear elements engage the first and the second rack, respectively, when the drive shaft is in a neutral position.

20 Claims, 10 Drawing Sheets

MECHANICAL BOOLEAN STEERING

BACKGROUND OF THE INVENTION

1. Field of the Invention

The present invention relates generally to vehicle steering mechanisms, and more particularly, pertains to an apparatus and method for steering a vehicle to follow a track or guideway.

2. Description of the Related Art

Vehicles adapted to travel on a track or a guideway typically employ at least one bogie attached to a vehicle frame. The bogie supports an axle having wheels with tires attached thereto. The vehicle further includes a steering linkage having a series of tie rods coupled to knuckles to turn the wheels with respect to the longitudinal axis of the vehicle frame. In a conventional arrangement, a first tie rod is connected to a steering mechanism and a first wheel while a second tie rod connects the first and seconds wheels. The vehicle is steered along a track or a pathway by a steering mechanism acting on the first tie rod. A typical steering mechanism is a rack and pinion arrangement.

While a conventional rack and pinion system enjoys a widespread use, there exist a number of limitations and disadvantages to this system. Depending on whether the vehicle is making a left or a right turn, current steering mechanisms result in asymmetrical steering angles. This presents unique problems for bi-directional vehicles. Due to the arrangement of the tie rods, turning the wheels at a particular angle in a first direction (i.e., left or right) requires a different steering angle input compared to turning the wheels at that same angle in a second direction (i.e., right or left, respectively). This non-linearity of steering input is intrinsic to the arrangement of the tie rods in the steering linkage system. An automatic guidance system which steers the vehicle along a predetermined track or guideway must account for the non-linearity resulting from the use of conventional steering mechanisms.

A design is needed which eliminates the bias associated with the non-linearity intrinsic to the steering linkage. There is a need in the art for a steering mechanism that provides symmetrical steering angles regardless of whether the vehicle is turning in a left or right direction.

SUMMARY OF THE INVENTION

In one embodiment, the present invention is directed to a steering system for a vehicle adapted to travel on a track or a guideway. The vehicle desirably includes at least one steerable wheel connected to an axle pivotably supported by a support frame. In accordance with this embodiment, the steering system may include a drive shaft having a rotational axis along its length. First and second substantially semicircular gear elements may be provided on the drive shaft and adapted to engage first and second racks, respectively. The first and second substantially semicircular gear elements may be offset along the rotational axis of the drive shaft and may be located about a common end of the drive shaft.

In the steering system according to one embodiment, the first substantially semicircular gear element may engage the first rack when the drive shaft is rotated in a first direction. Similarly, the second substantially semicircular gear element may engage the second rack when the drive shaft is rotated in a second direction. The second direction is desirably opposite to the first direction. Both the first and the second substantially semicircular gear elements may engage the first and the second rack, respectively, when the drive shaft is in a neutral position. With rotation of the drive shaft in the first or second direction, the first and second substantially semicircular gear elements may actuate the first or second rack, respectively, in a linear motion.

In accordance with another embodiment, with rotation of the drive shaft in the first direction from the neutral position, the second substantially semicircular gear element may be disengaged from the second rack. Similarly, with rotation of the drive shaft in the second direction from the neutral position, the first substantially semicircular gear element may be disengaged from the first rack. The first and second substantially semicircular gear elements may be connected to a first and second portion of the drive shaft, respectively, by at least one first and second connection member, respectively.

In accordance with a further embodiment, the first substantially semicircular gear element may be offset from the second substantially semicircular gear element circumferentially about a circumference of the drive shaft. For example, the first substantially semicircular gear element may be offset from the second substantially semicircular gear element by 180° about the circumference of the drive shaft. A part of the first substantially semicircular gear element may overlap a part of the second substantially semicircular gear element.

According to yet another embodiment, the first substantially semicircular gear element may be connected to the second substantially semicircular gear element at an overlapping portion of the first and second substantially semicircular gear elements. In another embodiment, the first substantially semicircular gear element has a plurality of first teeth that engage a plurality of corresponding teeth on the first rack and wherein the second substantially semicircular gear element has a plurality of second teeth that engage a plurality of corresponding teeth on the second rack. The plurality of first and second teeth on the first and second substantially semicircular gear elements, respectively, and the plurality of corresponding teeth on the first and second racks, respectively, may be linear or helical gear teeth. In one embodiment, the plurality of first and second teeth on the first and second substantially semicircular gear elements, respectively, and the plurality of corresponding teeth on the first and second racks, may have the same or different gear pitch.

In another embodiment, the present invention is directed to a method of steering or maintaining a travel path of a vehicle. The vehicle is desirably adapted to travel on a track or a guideway and desirably has at least one steerable wheel connected to an axle pivotably supported by a support frame. In accordance with this embodiment, the method may include the step of maintaining a vehicle steering system in a neutral position to maintain the travel path of the vehicle in a straight line. In another step, the vehicle steering system may be engaged in a first direction to cause the vehicle to turn in a direction corresponding to the first direction. In a further step, engaging the vehicle steering system in a second direction may cause the vehicle to turn in a direction corresponding to the second direction.

The vehicle steering system may include a drive shaft having a rotational axis along its length and first and second substantially semicircular gear elements provided on the drive shaft and adapted to engage a first rack. The first and second substantially semicircular gear elements may be offset along the rotational axis of the drive shaft and may be located about a common end of the drive shaft. The first substantially semicircular gear element may engage the first rack when the drive shaft is rotated in a first direction. Similarly, the second substantially semicircular gear element may engage the second rack when the drive shaft is rotated in a second direction, the second direction being opposite to the first direction. Both first and second substantially semicircular gear elements may engage the first and second racks, respectively, when the drive shaft is in a neutral position. Rotation of the drive shaft in the first direction to engage the first substantially semicircular gear element with the first rack may cause the first rack to move in a linear motion. Correspondingly, rotation of the drive shaft in the second direction to engage the second substantially semicircular gear element with the second rack may cause the second rack to move in a linear motion. Additionally, rotation of the drive shaft in the first direction may cause the second substantially semicircular gear element to disengage from the second rack. Similarly, rotation of the drive shaft in the second direction may cause the first substantially semicircular gear element to disengage from the first rack.

In accordance with another embodiment, the present invention is directed to a vehicle adapted to travel on a track or a guideway. The vehicle desirably includes at least one steerable wheel connected to an axle pivotably supported by a support frame. The vehicle, may include a steering system for steering the vehicle. A steering wheel may be operatively connected to a drive shaft of the steering system. At least one steerable wheel may be operatively connected to the steering system. In accordance with this embodiment, the steering system may include a first and second substantially semicircular gear element adapted to engage a first and second rack, respectively. The first and second substantially semicircular gear elements may be offset along the rotational axis of the drive shaft and may be located about a common end of the drive shaft. The first substantially semicircular gear element may engage the first rack when the drive shaft is rotated in a first direction to steer the vehicle in the first direction. Similarly, the second substantially semicircular gear element may engage the second rack when the drive shaft is rotated in a second direction to steer the vehicle in the second direction, the second direction being opposite to the first direction. Both first and second substantially semicircular gear elements may engage the first and second rack, respectively, when the drive shaft is in a neutral position.

These and other features and characteristics of the steering system, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PRESENT INVENTION

Figure 1:
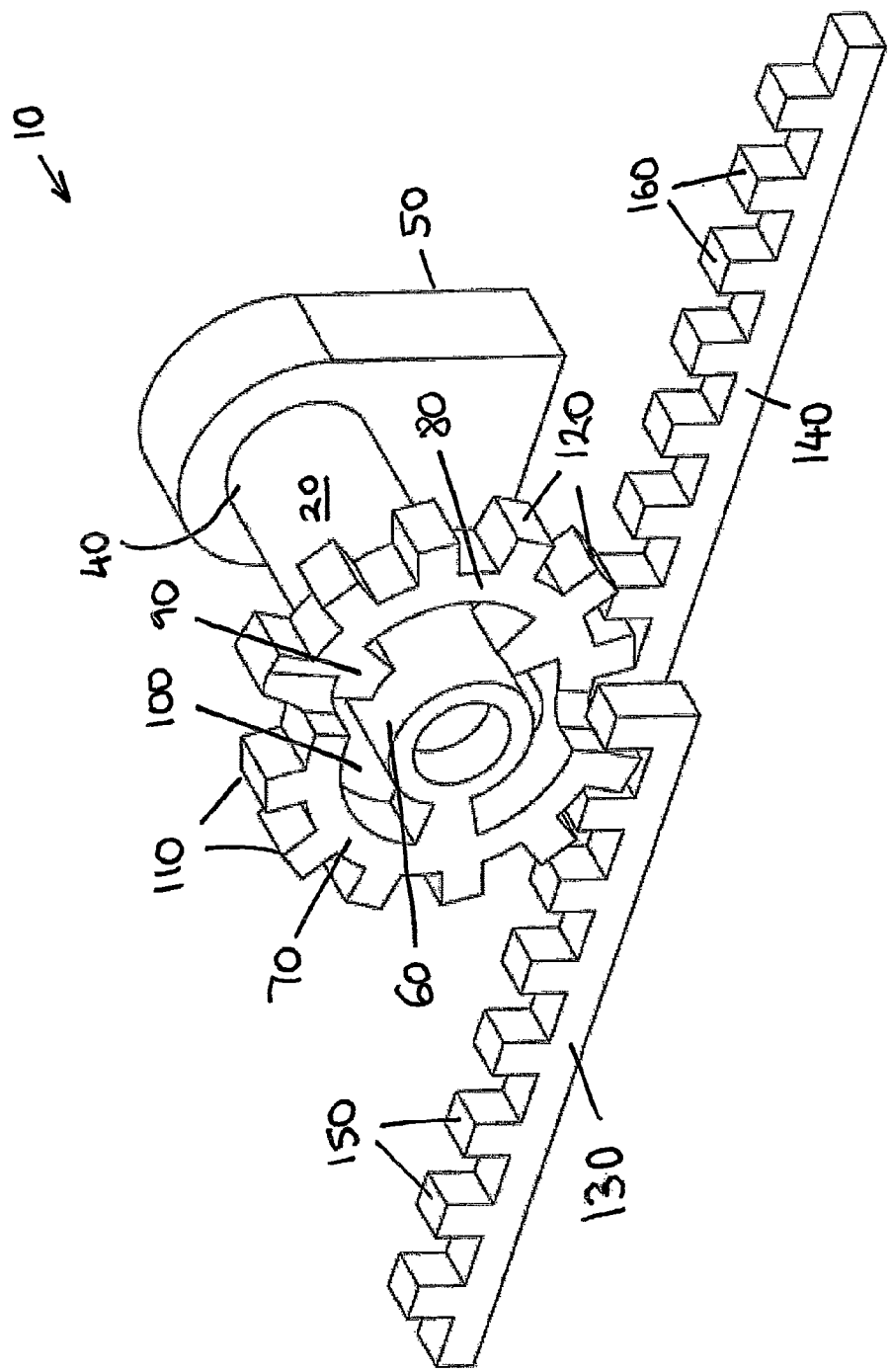
FIG. 1 is a front perspective view of a steering system in accordance with one embodiment with the steering system being in a neutral position.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

With reference to FIGS. 1-9, a steering system 10 is configured for use in a vehicle for providing symmetrical steering angles regardless of whether the vehicle is turning in a left or right direction. Steering system 10 may be implemented for use in a vehicle shown in FIG. 10.

Steering system 10 includes a drive shaft 20 having a rotational axis 30 defined along its longitudinal length. Drive shaft 20 may be tubular or non-tubular. While drive shaft 20, illustrated in FIGS. 1-9, has a circular cross-section, other geometric shapes are also contemplated.

Drive shaft 20 has a first end 40 rotatably supported by a drive shaft support member 50. Drive shaft support member 50 desirably has a bearing (not shown) for rotatably supporting first end 40 of drive shaft 20. First end 40 of drive shaft 20 may extend past drive shaft support member 50 for connecting with a steering wheel (not shown) or a similar means for controlling steering system 10. Drive shaft 20 is operable for transmitting a steering input to change a travel path of a vehicle.

Figure 4:
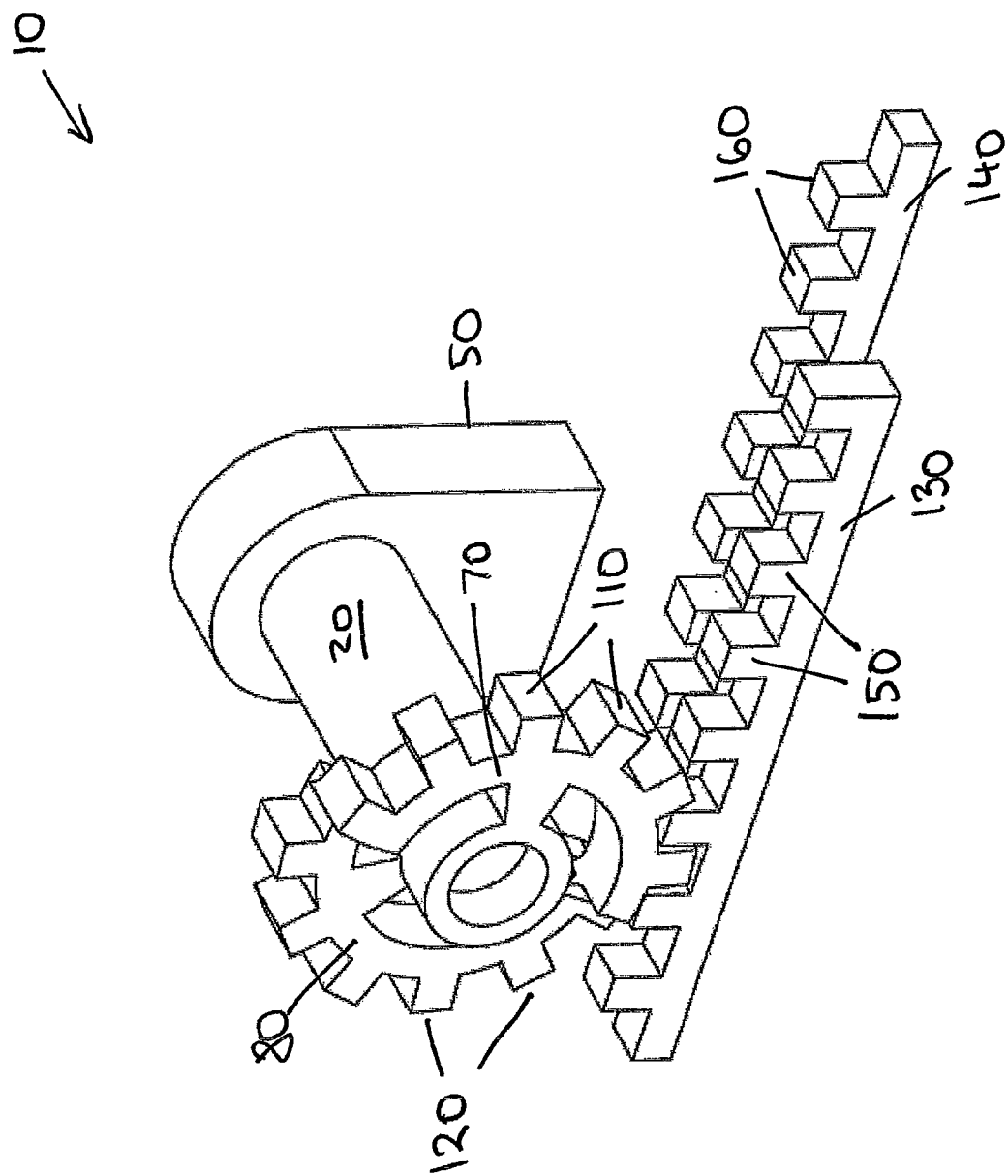
FIG. 4 is a front perspective view of the steering system shown in FIG. 1 with the steering system oriented in a first direction.
Figure 7:
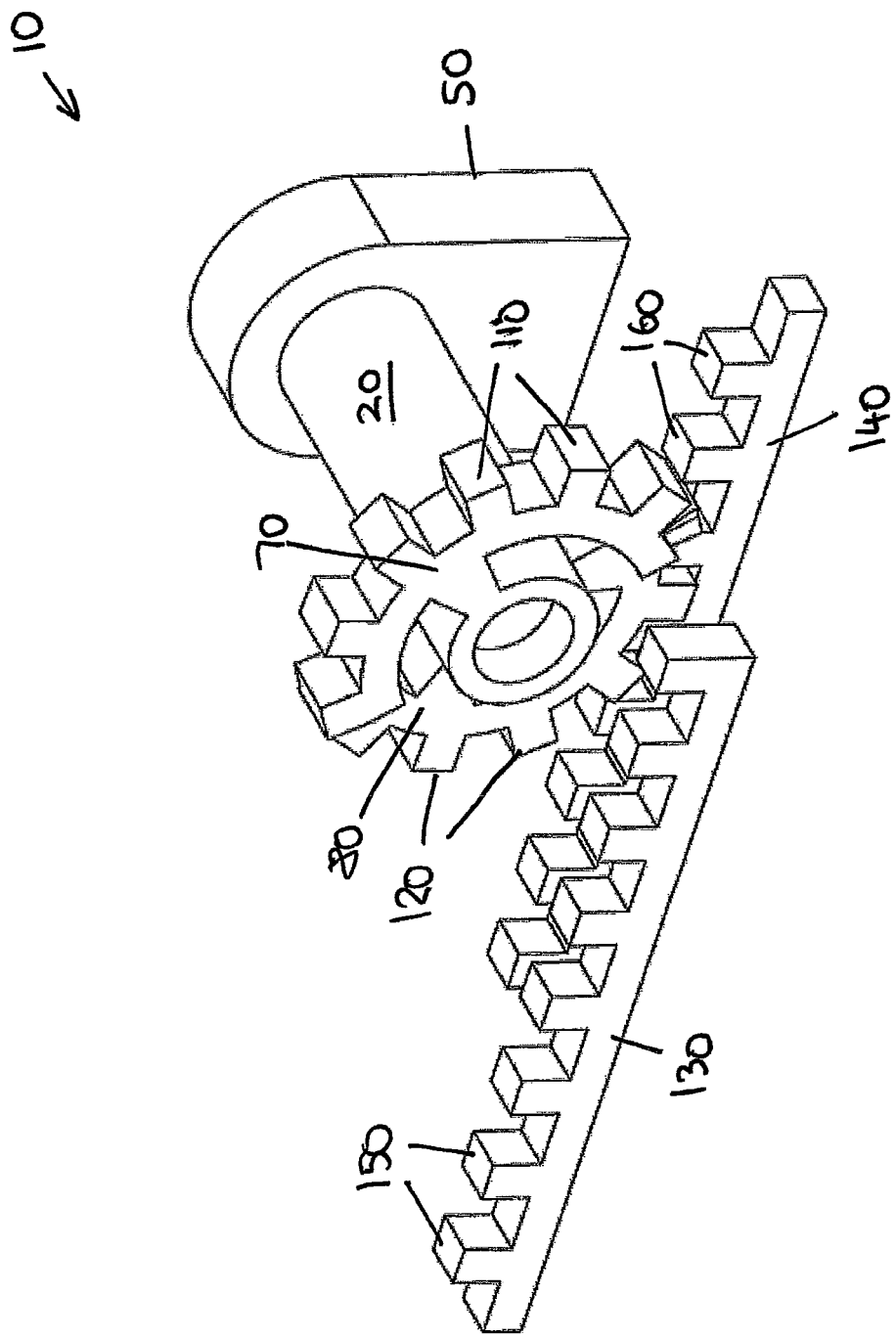
FIG. 7 is a front perspective view of the steering system shown in FIG. 1 with the steering system oriented in a second direction.

With particular reference to FIGS. 1, 4, and 7, second end 60 of drive shaft 20 is provided opposite first end 40. Second end 60 includes a first gear element 70 and a second gear element 80. First and second gear elements 70, 80 are fixed with respect to drive shaft 20 such that rotational movement of drive shaft 20 causes a corresponding rotational movement of first and second gear elements 70, 80. Each of the gear elements is fixed to second end 60 of drive shaft 20 by welding, interference fit, one or more fasteners, or a similar mechanical fastening means. At least one connection member, such as a gear spoke 90, connects each of first and second gear elements 70, 80 to drive shaft 20. One or more recesses 100 are provided between spokes 90. In some embodiments, one or both first and second gear elements 70, 80 may be connected to drive shaft 20 along their entire circumference that engages drive shaft 20 such that no recesses 100 are created.

With continuing reference to FIGS. 1-9, first and second gear elements 70, 80 have a generally semicircular shape extending over at least 180° of a circular arc. In one embodiment, each of the first and second gear elements 70, 80 extends slightly over 180° of a circular arc. First and second gear elements 70, 80 are offset radially about rotational axis 30 of drive shaft 20 such that first gear element 70 approximately covers the first 180° of the drive shaft 20 circumference, while second gear element 80 covers the second 180° of the drive shaft 20 circumference. In some embodiments, first gear element 70 may slightly overlap second gear element 80.

Furthermore, first and second gear elements 70, 80 are offset axially along rotational axis 30 of drive shaft 20 such that one of the first gear element 70 or second gear element 80 is located closer to first end 40 of drive shaft 20, while the other of first gear element 70 or second gear element 80 is located closer to second end 60 of drive shaft 20. Terminal ends of each gear element 70, 80 may be connected together, such as by welding or a similar mechanical fastening means. First gear element 70 may be connected to the second gear element 80 at the overlapping portion of the gear elements.

With continuing reference to FIGS. 1-9, first gear element 70 has a plurality of first teeth 110 provided on its upper face. Similarly, second gear element 80 has a plurality of second teeth 120 provided on its upper face. First and second teeth 110, 120 may be linear gear teeth or helical gear teeth. In some embodiments, the type of first teeth 110 may be different from the type of second gear teeth 120. Additionally, first and second teeth 110, 120 may have a same or different gear pitch. One of ordinary skill in the art would know that various combinations of gear types and gear pitch are possible for each of first and second teeth 110, 120. For example, first teeth 110 on first gear element 70 may be linear gear teeth having a first pitch and second teeth 120 on second gear element 80 may be helical gear teeth having a second pitch. First teeth 110 may be identical to second teeth 120.

Steering system 10 further includes a first rack 130 and a second rack 140. First gear element 70 is adapted for engaging first rack 130 and second gear element 80 is adapted for engaging second rack 140. First rack 130 includes a plurality of first rack teeth 150 that are adapted for meshing with a plurality of first teeth 110 on first gear element 70. Similarly, second rack 140 includes a plurality of second rack teeth 160 that are adapted for meshing with a plurality of second teeth 120 on second gear element 80. First rack 130 may be linearly offset from second rack 140. Each rack 130, 140 may be connected to a steering linkage (not shown) to control the movement of vehicle wheels.

Figure 8:
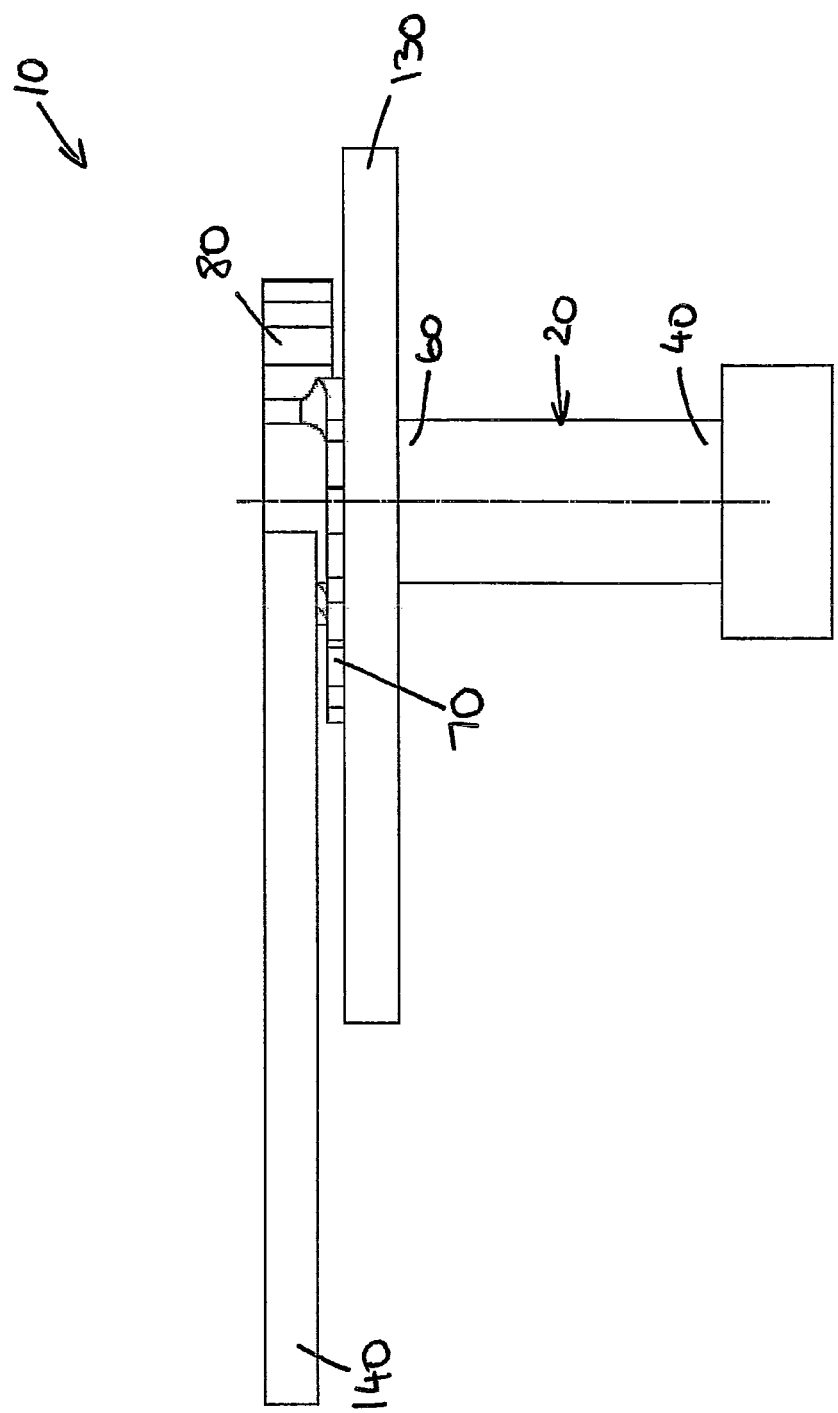
FIG. 8 is a bottom view of the steering system shown in FIG. 7.
Figure 9:
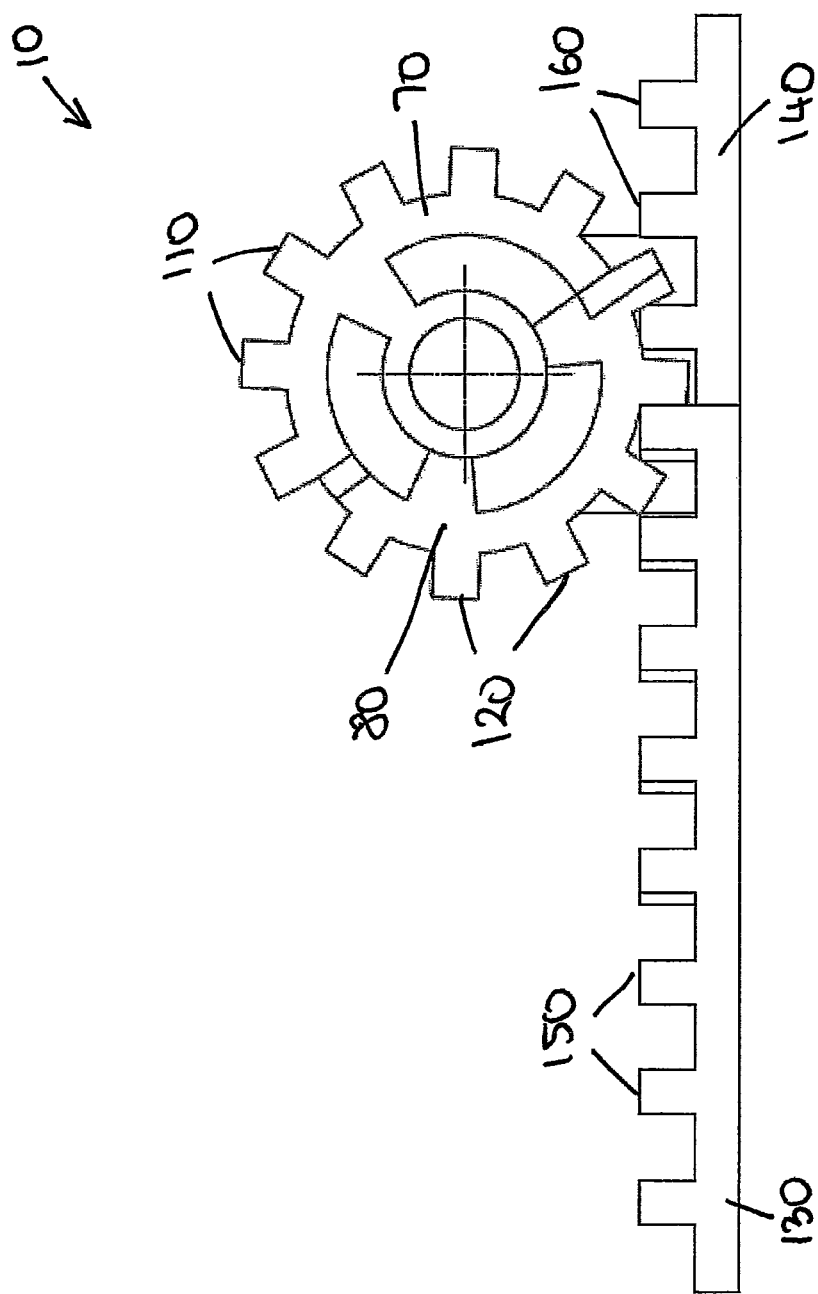
FIG. 9 is a front view of the steering system shown in FIG. 7.

Having described the components of steering system 10, the operating principle of steering system 10 will now be described. With reference to FIGS. 1-9, steering system 10 may take one of three operating states: neutral (FIGS. 1-3); turning in a first direction (FIGS. 4-6); and turning in a second direction (FIGS. 7-9). It is understood that the first direction is opposite the second direction. For example, the first direction may direct a travel path of a vehicle to the left, while the second direction may direct the travel path of the vehicle to the right.

Figure 2:
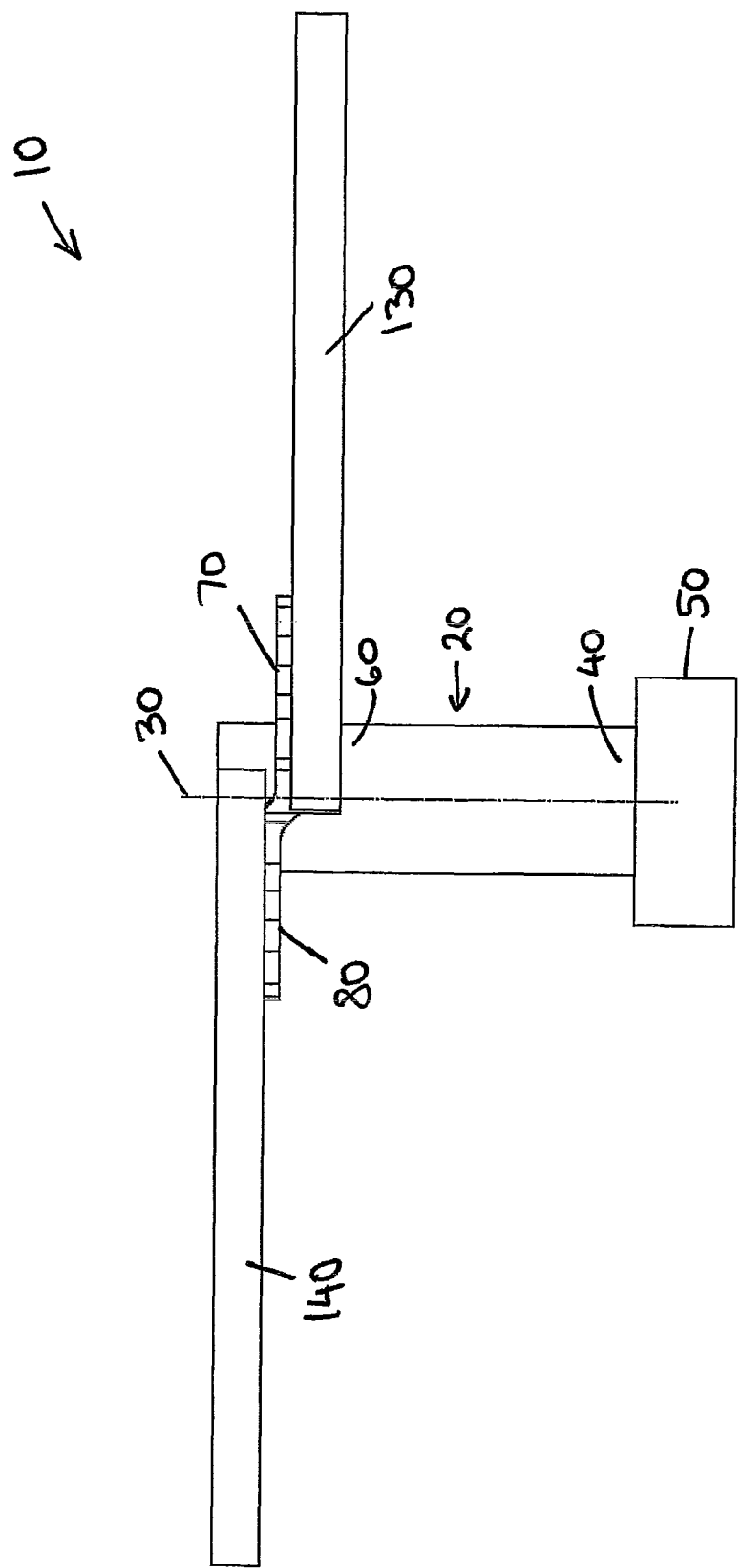
FIG. 2 is a bottom view of the steering system shown in FIG. 1.
Figure 3:
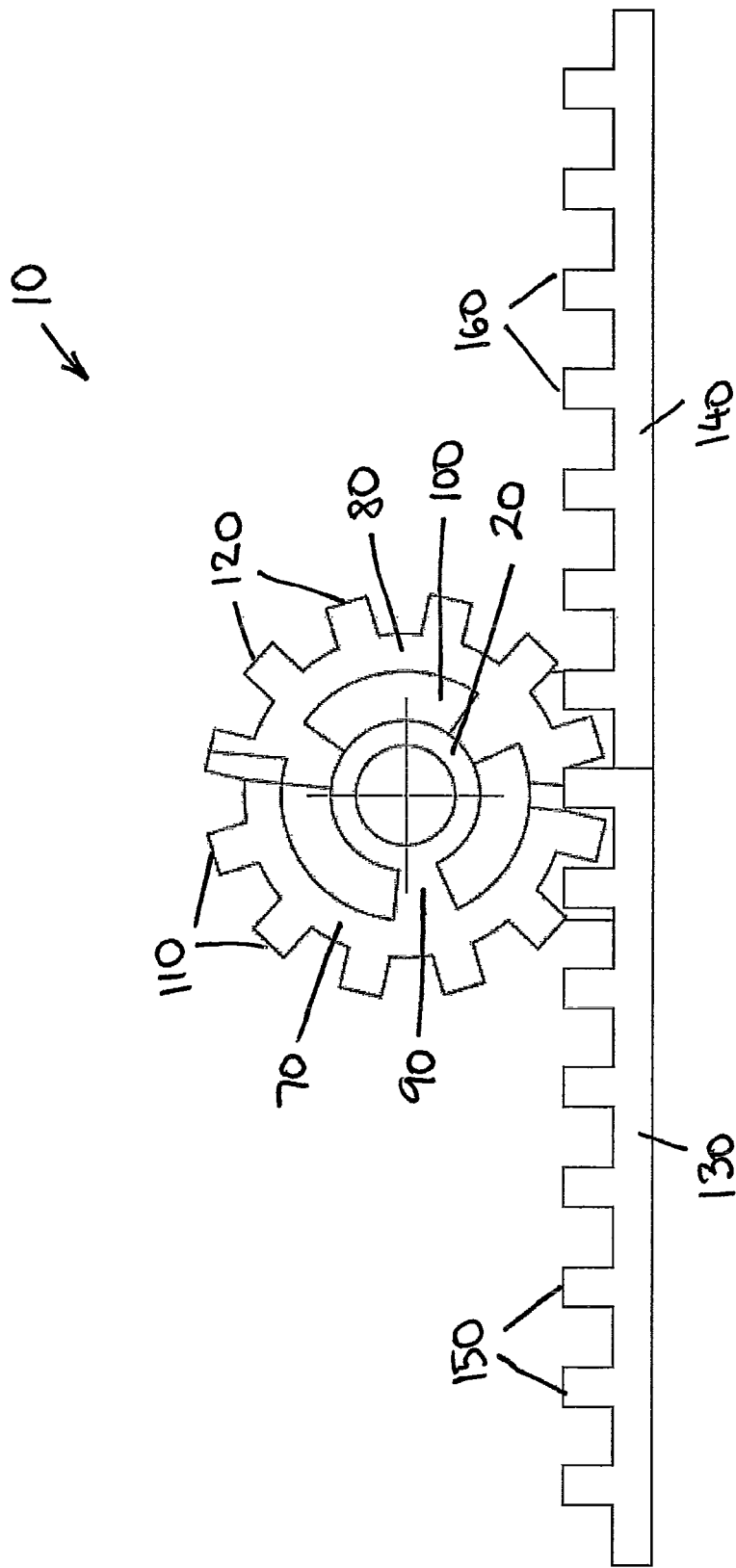
FIG. 3 is a front view of the steering system shown in FIG. 1.

With particular reference to FIGS. 1-3, a neutral state of steering system 10 is shown. In this state, a travel path of a vehicle is maintained in a straight direction. To accomplish this, drive shaft 20 is oriented such that at least one of first teeth 110 on first gear element 70 engages at least one of first rack teeth 150 on first rack 130 and at least one of second teeth 120 on second gear element 80 engages at least one of second rack teeth 160 on second rack 140. In this configuration, both gear elements 70, 80 are engaged with both racks 130, 140 to prevent movement of either rack and a corresponding movement of the vehicle wheels. To maintain a travel path in a straight direction, first and second gear elements 70, 80 are oriented such that at least one tooth on each gear element engages its respective rack. Movement of drive shaft 20 from the neutral position in a first direction (i.e., clockwise or counterclockwise) will cause one of gear elements 70, 80 to disengage from its respective rack, and movement in the opposite direction (i.e., counterclockwise or clockwise, respectively) will cause the other of gear elements 70, 80 to disengage from its respective rack.

Figure 5:
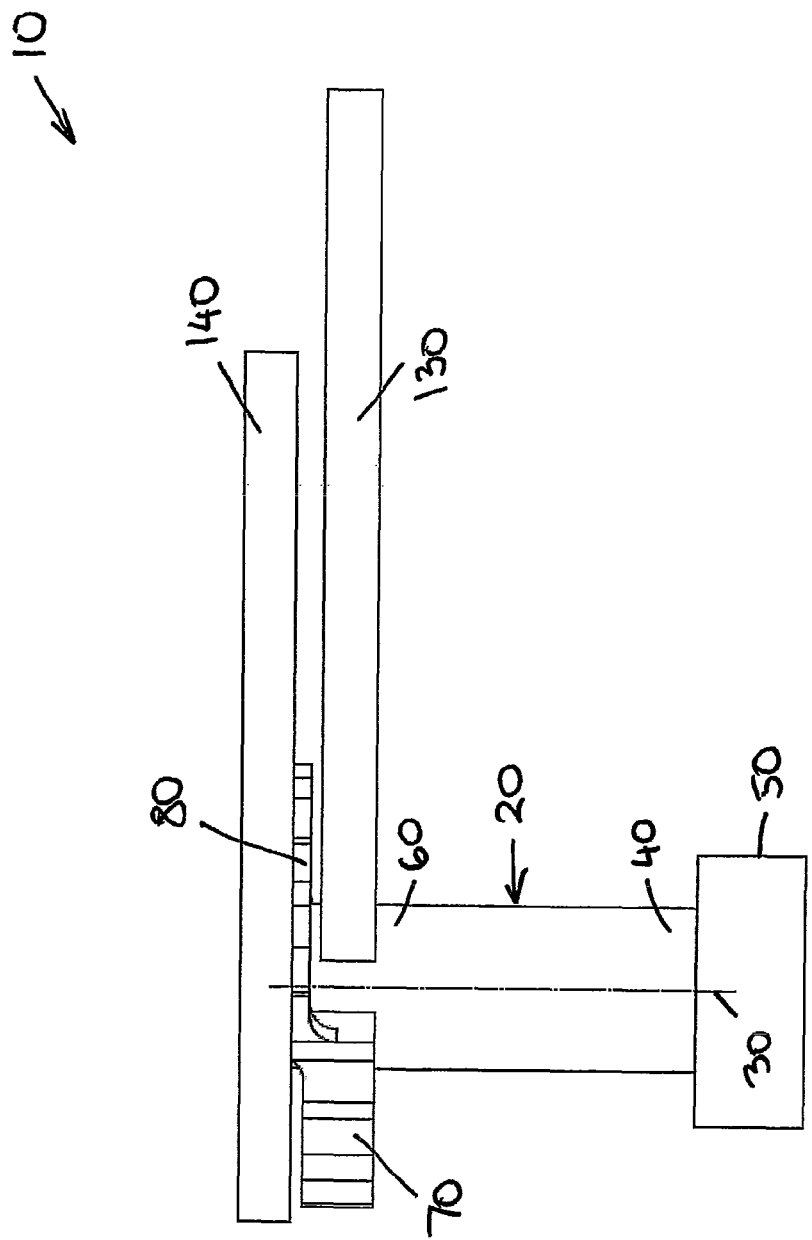
FIG. 5 is a bottom view of the steering system shown in FIG. 4.
Figure 6:
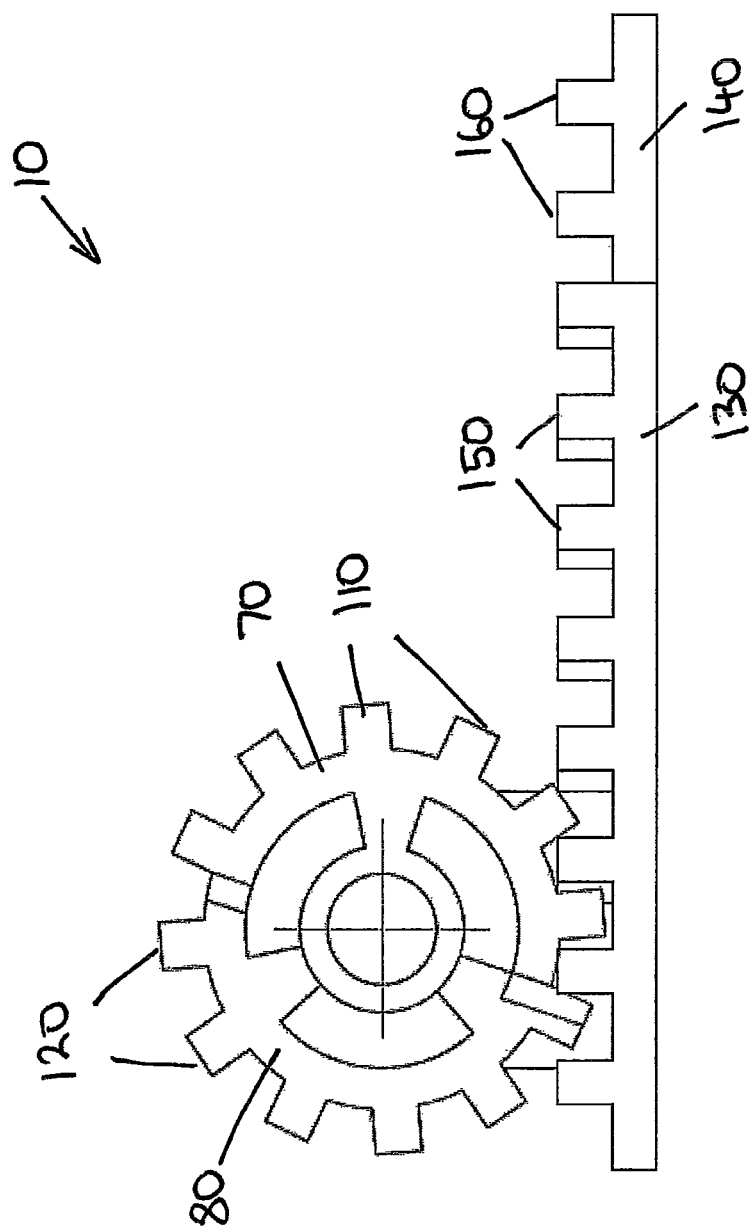
FIG. 6 is a front view of the steering system shown in FIG. 4.

Rotation of drive shaft 20 from the neutral position illustrated in FIGS. 1-3 in a first direction (i.e., clockwise or counterclockwise) causes first gear element 70 to continue engaging first rack 130 while simultaneously causing disengagement of second gear element 80 from second rack 140. Rotational movement of drive shaft 20 about rotational axis 30 in the first direction causes a linear movement of first rack 130. This condition, in which steering system 10 would cause a vehicle to steer in a first direction, is illustrated in FIGS. 4-6. Rotation of drive shaft 20 in the first direction is desirably limited to approximately 180° in the first direction from the neutral position. Otherwise, continued rotation of drive shaft 20 past 180° of rotation from the neutral position would cause first gear element 70 to disengage from first rack 130 while causing second gear element 80 to engage second rack 140, thereby turning the vehicle in a second direction. This may be undesirable, particularly when travel in the first direction needs to be maintained. In order to eliminate the possibility of disengaging first gear element 70 from first rack 130 while turning in the first direction, a stop member (not shown) may be provided to limit the rotation of drive shaft 20 to 180° in the first or second direction from the neutral position shown in FIGS. 1-3.

With reference to FIGS. 7-9, rotation of drive shaft 20 from the neutral position illustrated in FIGS. 1-3 in a second direction causes second gear element 80 to continue engaging second rack 140 while simultaneously causing disengagement of first gear element 70 from first rack 130. Rotational movement of drive shaft 20 about rotational axis 30 in the second direction causes a linear movement of second rack 140. This condition, in which steering system 10 would cause a vehicle to steer in a second direction, is illustrated in FIGS. 7-9. Rotation of drive shaft 20 in the first direction is desirably limited to approximately 180° in the second direction from the neutral position.

Figure 10:
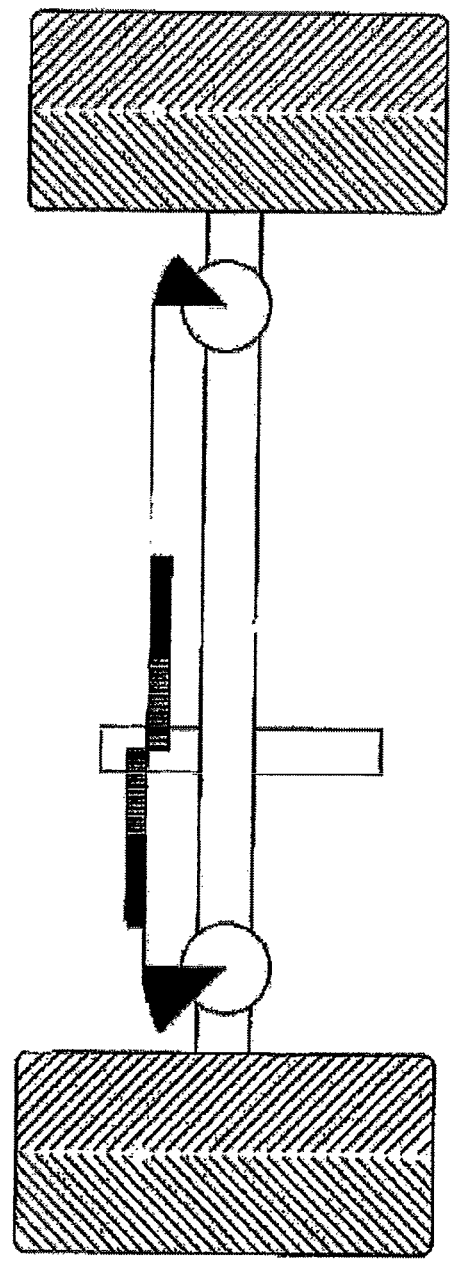
FIG. 10 is a top view of a vehicle axle having a steering system in accordance with one embodiment of the present invention.

The steering system embodiments described in detail above are simple, robust, and easily adaptable for use with various vehicles. With reference to FIG. 10, steering system 10 is adapted for use on a vehicle 200 having a wheel with a pneumatic tire 210 connected at opposing ends of an axle 220. Adjacent to each tire 210 is a steering knuckle 230 operative for causing the wheel to turn depending on whether steering knuckle 230 is pushed or pulled. Steering system 10 is provided on vehicle 200 such that rotational axis 30 of drive shaft 20 is substantially perpendicular to axle 220. In this configuration, first and second racks 130, 140 are maintained substantially parallel to axle 220. Each rack 130, 140 is connected to steering knuckle 230 via a cable 240. In certain embodiments, cable 240 may be replaced with a spring or a rod. A steering wheel 250 is provided at a first end of drive shaft 20.

As previously discussed with regard to FIGS. 1-3, in order to maintain a travel path of vehicle 200 in a straight direction, drive shaft 20 is oriented in a neutral position (shown in FIG. 10) such that at least one of the teeth on the first gear element engages at least one of the rack teeth on first rack 130 and at least one of the teeth on the second gear element engages at least one of the rack teeth on second rack 140. In this configuration, both gear elements are engaged with both racks 130, 140 to prevent movement of either rack and a corresponding pushing or pulling of cables 240. Turning steering wheel 250 to cause rotation of drive shaft 20 from the neutral position in a first direction (i.e., clockwise or counterclockwise) will cause one of the gear elements to disengage from its respective rack, and movement in the opposite direction (i.e., counterclockwise or clockwise, respectively) will cause the other of the gear elements to disengage from its respective rack.

In order to cause vehicle 200 to turn in a first or second direction, steering wheel 250 is turned to cause rotation of drive shaft 20 in the first or second direction. This causes a corresponding linear movement of one of first or second rack 130, 140 away from steering knuckle 230 that is connected to either first or second rack 130, 140 via cable 240. Linear movement of either rack causes tension in cable 240 (or spring or rod arrangement), which consequently results in knuckle 230 being pulled. Movement of knuckle 230 causes a corresponding movement of tire 210. Opposing knuckles 230 are desirably connected by a tie rod such that movement of one knuckle causes a corresponding movement of the opposing knuckle, thereby turning both tires 210 in a desired direction of travel.

Although a steering system has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. For example, it is to be understood that this disclosure contemplates that, to the extent possible, one or more features of any embodiment can be combined with one or more features of any other embodiment.

The invention claimed is:

1. A steering system for a vehicle adapted to travel on a track or a guideway, the vehicle having at least one steerable wheel connected to an axle pivotably supported by a support frame, the steering system comprising:
    a drive shaft having a rotational axis along its length;
    a first substantially semicircular gear element provided on the drive shaft and adapted to engage a first rack;
    a second substantially semicircular gear element provided on the drive shaft and adapted to engage a second rack,
    wherein the first and second substantially semicircular gear elements are offset along the rotational axis of the drive shaft and are located about a common end of the drive shaft such that:
    the first substantially semicircular gear element engages the first rack when the drive shaft is rotated in a first direction;
    the second substantially semicircular gear element engages the second rack when the drive shaft is rotated in a second direction, the second direction being opposite to the first direction; and
    both first and second substantially semicircular gear elements engage the first and the second rack, respectively, when the drive shaft is in a neutral position.

2. The steering system of claim 1, wherein, with rotation of the drive shaft in the first direction, the first substantially semicircular gear element actuates the first rack in a linear motion.

3. The steering system of claim 1, wherein, with rotation of the drive shaft in the second direction, the second substantially semicircular gear element actuates the second rack in a linear motion.

4. The steering system of claim 1, wherein, with rotation of the drive shaft in the first direction from the neutral position, the second substantially semicircular gear element is disengaged from the second rack.

5. The steering system of claim 1, wherein, with rotation of the drive shaft in the second direction from the neutral position, the first substantially semicircular gear element is disengaged from the first rack.

6. The steering system of claim 1, wherein the first substantially semicircular gear element is connected to a first portion of the drive shaft by at least one first connection member.

7. The steering system of claim 1, wherein the second substantially semicircular gear element is connected to a second portion of the drive shaft by at least one second connection member.

8. The steering system of claim 1, wherein the first substantially semicircular gear element is offset from the second substantially semicircular gear element circumferentially about a circumference of the drive shaft.

9. The steering system of claim 7, wherein the first substantially semicircular gear element is offset from the second substantially semicircular gear element by 180° about the circumference of the drive shaft.

10. The steering system of claim 7, wherein a part of the first substantially semicircular gear element overlaps a part of the second substantially semicircular gear element.

11. The steering system of claim 7, wherein the first substantially semicircular gear element is connected to the second substantially semicircular gear element at an overlapping portion of the first and second substantially semicircular gear elements.

12. The steering system of claim 1, wherein the first substantially semicircular gear element has a plurality of first teeth that engages a plurality of corresponding teeth on the first rack and wherein the second substantially semicircular gear element has a plurality of second teeth that engages a plurality of corresponding teeth on the second rack.

13. The steering system of claim 12, wherein the plurality of first and second teeth on the first and second substantially semicircular gear elements, respectively, and the plurality of corresponding teeth on the first and second racks, respectively, are linear gear teeth.

14. The steering system of claim 8, wherein the plurality of first and second teeth on the first and second substantially semicircular gear elements, respectively, and the plurality of corresponding teeth on the first and second racks, respectively, are helical gear teeth.

15. The steering system of claim 8, wherein the plurality of first and second teeth on the first and second substantially semicircular gear elements, respectively, and the plurality of corresponding teeth on the first and second racks, respectively, have the same gear pitch.

16. The steering system of claim 8, wherein the plurality of first teeth on the first substantially semicircular gear element and the plurality of corresponding teeth on the first rack have a different gear pitch compared to the plurality of second teeth on the second substantially semicircular gear element and the plurality of corresponding teeth on the second rack.

17. A method of steering or maintaining a travel path of a vehicle adapted to travel on a track or a guideway, the vehicle having at least one steerable wheel connected to an axle pivotably supported by a support frame, the method comprising the steps of:
    maintaining a vehicle steering system in a neutral position to maintain the travel path of the vehicle in a straight line;

engaging the vehicle steering system in a first direction to cause the vehicle to turn in a direction corresponding to the first direction; and engaging the vehicle steering system in a second direction to cause the vehicle to turn in a direction corresponding to the second direction, wherein the vehicle steering system comprises:

a drive shaft having a rotational axis along its length;

a first substantially semicircular gear element provided on the drive shaft and adapted to engage a first rack; and a second substantially semicircular gear element provided on the drive shaft and adapted to engage a second rack, wherein the first and second substantially semicircular gear elements are offset along the rotational axis of the drive shaft and are located about a common end of the drive shaft such that:

the first substantially semicircular gear element engages the first rack when the drive shaft is rotated in a first direction;

the second substantially semicircular gear element engages the second rack when the drive shaft is rotated in a second direction, the second direction being opposite to the first direction; and both first and second substantially semicircular gear elements engage the first and the second rack, respectively, when the drive shaft is in a neutral position.

18. The method of claim 17, wherein rotation of the drive shaft in the first direction to engage the first substantially semicircular gear element with the first rack causes the first rack to move in a linear motion and wherein rotation of the drive shaft in the second direction to engage the second substantially semicircular gear element with the second rack causes the second rack to move in a linear motion.

19. The method of claim 17, wherein rotation of the drive shaft in the first direction causes the second substantially semicircular gear element to disengage from the second rack, and wherein rotation of the drive shaft in the second direction causes the first substantially semicircular gear element to disengage from the first rack.

20. A vehicle adapted to travel on a track or a guideway, the vehicle comprising:

at least one steerable tire connected to an axle pivotably supported by a support frame;

a steering system for steering the vehicle;

a steering wheel operatively connected to a drive shaft of the steering system; and at least one wheel operatively connected to the steering system, wherein the steering system further comprises:

a first substantially semicircular gear element adapted to engage a first rack; and a second substantially semicircular gear element adapted to engage a second rack, wherein the first and the second substantially semicircular gear elements are offset along the rotational axis of the drive shaft and are located about a common end of the drive shaft such that:

the first substantially semicircular gear element engages the first rack when the drive shaft is rotated in a first direction to steer the first wheel in the first direction;

the second substantially semicircular gear element engages the second rack when the drive shaft is rotated in a second direction to steer the second wheel in the second direction, the second direction being opposite to the first direction; and both the first and the second substantially semicircular gear elements engage the first and the second rack, respectively, when the drive shaft is in a neutral position to maintain the first and second wheels in a neutral position.

* * * * *